(12) United States Patent
Zhang et al.

(10) Patent No.: US 10,040,032 B2
(45) Date of Patent: Aug. 7, 2018

(54) COMPLEX NANOFILTRATION MEMBRANE AND THE PREPARATION THEREOF

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Yang Zhang, Beijing (CN); Yiqun Liu, Beijing (CN); Guoyuan Pan, Beijing (CN); Hao Yan, Beijing (CN); Jian Xu, Beijing (CN); Min Guo, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(*) Notice: Subject to any disclaimer, the term of this patent is extended or adjusted under 35 U.S.C. 154(b) by 109 days.

(21) Appl. No.: 14/805,801

(22) Filed: Jul. 22, 2015

(65) Prior Publication Data

US 2016/0023168 A1 Jan. 28, 2016

(30) Foreign Application Priority Data

Jul. 22, 2014 (CN) .......................... 2014 1 0349015

(51) Int. Cl.
*B01D 71/52* (2006.01)
*B01D 71/38* (2006.01)
(Continued)

(52) U.S. Cl.
CPC ..... *B01D 67/0093* (2013.01); *B01D 67/0006* (2013.01); *B01D 69/02* (2013.01);
(Continued)

(58) Field of Classification Search
None
See application file for complete search history.

(56) References Cited

U.S. PATENT DOCUMENTS

| 4,765,897 A | 8/1988 | Cadotte et al. |
| 4,769,148 A | 9/1988 | Fibiger et al. |

(Continued)

FOREIGN PATENT DOCUMENTS

| CN | 101462024 A | 6/2009 |
| CN | 101732998 A | 6/2010 |

OTHER PUBLICATIONS

English machine translation of JP,06-016738,A(1994).*

(Continued)

*Primary Examiner* — Krishnan S Menon
(74) *Attorney, Agent, or Firm* — Buchanan Ingersoll & Rooney, PC (57) ABSTRACT

A complex nanofiltration membrane comprising a substrate and a separating layer, wherein the separating layer is an oxidant-treated, crosslinked network structure formed from a hydroxyl-containing polymer, a thiol-containing silane coupling agent and a crosslinking agent, is disclosed. Also disclosed are a process for preparing the complex nanofiltration membrane and use of the complex nanofiltration membrane in water treatment.

21 Claims, 2 Drawing Sheets

(51) Int. Cl.
- *B01D 67/00* (2006.01)
- *B01D 69/12* (2006.01)
- *C02F 1/44* (2006.01)
- *B01D 71/08* (2006.01)
- *B01D 69/02* (2006.01)
- *B01D 61/02* (2006.01)

(52) U.S. Cl.
CPC ........... *B01D 69/125* (2013.01); *B01D 71/08* (2013.01); *B01D 71/38* (2013.01); *B01D 71/52* (2013.01); *C02F 1/442* (2013.01); *B01D 61/027* (2013.01); *B01D 2323/30* (2013.01); *B01D 2323/46* (2013.01); *B01D 2325/04* (2013.01)

(56) References Cited

U.S. PATENT DOCUMENTS

| | | |
|---|---|---|
| 4,812,270 A | 3/1989 | Cadotte et al. |
| 4,824,574 A | 4/1989 | Cadotte et al. |
| 4,859,384 A | 8/1989 | Fibiger et al. |
| 5,369,012 A * | 11/1994 | Koontz ................... A61L 27/28 435/180 |
| 2006/0278580 A1* | 12/2006 | Striemer ................ B01D 61/18 210/650 |
| 2008/0185332 A1* | 8/2008 | Niu ..................... B01D 67/0083 210/500.38 |
| 2012/0241391 A1* | 9/2012 | Carlson .................. A01N 25/10 210/808 |

OTHER PUBLICATIONS

M. Liu et al., "Acid stable thin-film composite membrane for nanofiltration prepared from naphthalene-1,3,6-trisulfonylchloride (NTSC) and piperazine (PIP)", Journal of Membrane Science, 2012, vol. 415-416, pp. 122-131.

M. Dalwani et al., "Sulfonated poly(ether ether ketone) based composite membranes for nanofiltration of acidic and alkaline media", Journal of Membrane Science, 2011, vol. 381, pp. 81-89.

* cited by examiner

COMPLEX NANOFILTRATION MEMBRANE AND THE PREPARATION THEREOF

CROSS REFERENCE OF RELATED APPLICATIONS

The present application claims the benefit of the Chinese Patent Application No. 201410349015.9, filed on Jul. 22, 2014, which is incorporated herein by reference in their entirety and for all purposes.

FIELD OF THE INVENTION

The present invention relates to a complex nanofiltration membrane and a process for preparing the same.

BACKGROUND ART

Nanofiltration is a pressure-driven membrane separation process between reverse osmosis and ultrafiltration. Nanofiltration membranes have a pore diameter in the order of several nanometers, and are widely used in fresh water softening, seawater softening, potable water purging, water quality improvement, oil-water separation, waste water treatment and reclaim, and fraction, purification and concentration of chemicals such as dyes, antibiotics, polypeptides and polysaccharides.

At present, most of commercial nanofiltration membranes are prepared by utilizing a polysulfone ultrafiltration membrane as a substrate, and interfacially polymerizing a polyamine in water phase and a polyfunctional acyl halide in organic phase on the surface of the polysulfone ultrafiltration membrane, so that the final products are complex nanofiltration membranes. U.S. Pat. No. 4,769,148 and U.S. Pat. No. 4,859,384 disclose such polyamide-based nanofiltration membranes. In addition, U.S. Pat. No. 4,765,897, U.S. Pat. No. 4,812,270, and U.S. Pat. No. 4,824,574 disclose methods for converting a polyamide complex reverse osmosis membrane into a nanofiltration membrane. The moderate stability of polyamides limits the use of polyamide-based nanofiltration membranes to aqueous streams with a pH between 2 and 11.

Recently, many modifications have been made, and many new materials such as sulfonated poly(ether ketone) and sulfonated poly(ether sulfone) have been utilized in the nanofiltration field.

"Acid stable thin-film composite membrane for nanofiltration prepared from naphthalene-1,3,6-trisulfonylchloride (NTSC) and piperazine (PIP)", *J. Membr. Sci.*, 415-416, 122-131, 2012 reports the interfacial polymerization of polyfunctional sulfonylchloride monomer and piperazine to obtain complex nanofiltration membrane, which is said to maintain stable separation performance in an environment of pH=0.

"Sulfonated poly(etheretherketone) based composite membranes for nanofiltration of acidic and alkaline media", *J. Membr. Sci.*, 381, 81-89, 2011 reports a nanofiltration membrane having good tolerance to both acids and bases, and "Crosslinking of modified poly(etheretherketone) membranes for use in solvent resistant nanofiltration", *Journal of Membrane Science*, 447, 212-221, 2013 reports a nanofiltration membrane having good tolerance to solvents such as isopropanol and acetone.

Because of its good solubility and film forming ability, PVA has been used in nanofiltration and reverse osmosis field. In 1980's, GFT Company used crosslinked PVA (polyvinyl alcohol)/PAN (polyacrylonitrile) complex membrane as a permeation-vaporation membrane in dehydrating ethanol. CN101462024A discloses a complex reverse osmosis membrane comprising crosslinked PVA on a polyamide layer.

CN101732998A discloses a nanofiltration membrane comprising a porous supporting membrane and a coating of crosslinked polyvinyl furfural and the preparation thereof. Silane coupling agents are known in the art, and are used mainly in the adhesive field.

SUMMARY OF THE INVENTION

In order to overcome the drawbacks of nanofiltration membrane suffered by the prior art such as poor acid-tolerance and poor alkali-tolerance, the inventors have made diligently studies. As a result, the inventors have found that a hydroxyl-containing polymer, a thiol-containing silane coupling agent, and a crosslinking agent may react to form a crosslinked network structure, which has good acid/alkali-tolerance, a good mechanical property, and a good rejection property to inorganic salts and organic small molecules, especially after having been further treated with an oxidant. Thus, a complex nanofiltration membrane comprising a substrate and a separating layer, with the separating layer being an oxidant-treated, crosslinked network structure formed from a hydroxyl-containing polymer, a thiol-containing silane coupling agent and a crosslinking agent, is provided. The complex nanofiltration membrane of the invention may stably work in aqueous streams having a pH of from 0 to 14, has a high salt rejection and a high water permeability (water flux), has good acid/alkali-tolerance, and can be prepared by a simple process.

Thus, an object of the present invention is to provide a complex nanofiltration membrane, comprising a substrate and a separating layer, wherein the separating layer is an oxidant-treated, crosslinked network structure formed from a hydroxyl-containing polymer, a thiol-containing silane coupling agent and a crosslinking agent.

Another object of the present invention is to provide a process for preparing a complex nanofiltration membrane, comprising the steps of (1) dissolving a hydroxyl-containing polymer and a thiol-containing silane coupling agent in a solvent to prepare a coating solution;

(2) applying the coating solution on a substrate to form an initial membrane;

(3) immersing the initial membrane from step (2) in a crosslinking solution comprising a crosslinking agent and a crosslinking catalyst in a solvent to conduct a crosslinking reaction, to obtain an initial complex nanofiltration membrane comprising the substrate and a separating layer, which is a crosslinked network structure positioned on the surface of the substrate; and (4) treating the initial complex nanofiltration membrane with an aqueous solution containing an oxidant, to afford a final complex nanofiltration membrane.

Still another object of the present invention is to provide a complex nanofiltration membrane prepared by the above process.

Yet still another object of the present invention is to provide use of the complex nanofiltration membrane according to the invention in water treatment.

These and other features and virtues of the invention will be apparent from the following descriptions in details.

DETAILED DESCRIPTION OF PREFERRED EMBODIMENTS

In a first aspect, the present invention provides a complex nanofiltration membrane comprising a substrate and a separating layer, wherein the separating layer is an oxidant-treated, crosslinked network structure formed from a hydroxyl-containing polymer, a thiol-containing silane coupling agent and a crosslinking agent.

In an embodiment, the hydroxyl-containing polymer is chosen from polyethylene glycols, polyvinyl alcohols, chitosans, chitosan quaternary ammonium salts, polyether polyols, polyester polyols, and mixture thereof. From the view point of availability, the hydroxyl-containing polymer is preferably chosen from polyethylene glycols, polyvinyl alcohols, chitosans, and mixture thereof.

The molecular weight ($M_w$) of the polymers may be in the range from 5000 to 200000, and preferably from 10000 to 150000.

In an embodiment, the thiol-containing silane coupling agent may be γ-mercaptopropyl trimethoxy silane (KH590), γ-mercaptopropyl triethoxy silane (KH580), (2-mercaptoethyl)triethoxy silane, (2-mercaptoethyl)trimethoxy silane, or a mixture thereof.

In the present invention, there are no specific limitations to the thickness of the substrate and the thickness of the separating layer, and said thicknesses may be conventional selections in the art. However, in order to obtain a complex nanofiltration membrane having good acid- and alkali-tolerance, a high water flux, and a high salt rejection, the thickness of the substrate is preferably in a range of from 50 to 300 microns, more preferably a range of from 90 to 150 microns, and even more preferably in a range of from 100 to 120 microns, and the thickness of the separating layer is preferably in a range of from 0.03 to 1.0 microns, more preferably in a range of from 0.05 to 0.5 microns, and even more preferably in a range of from 0.1 to 0.3 microns.

In the present invention, there are no specific limitations to the substrate. In an embodiment, the substrate may be made of materials that are known in the art as having a certain strength and being used in a nanofiltration membrane or a reverse osmosis membrane. Examples of such materials include, but are not limited to, polyacrylonitrile, polyvinylidene fluoride, phenolphthalein non-sulfonated poly(aromatic ether sulphone), polyether sulphone, bisphenol A-type polysulfone, and mixture thereof.

In the present invention, there are no specific limitations to the contents of the hydroxyl-containing polymer moieties and the thiol-containing silane coupling agent moieties in the separating layer. However, preferably, during the formation of the separating layer, the hydroxyl-containing polymer is used in an amount of from 0.1 to 50 parts by weight, and preferably from 0.25 to 25 parts by weight, and the thiol-containing silane coupling agent is used in an amount of from 0.01 to 50 parts by weight, and preferably from 0.025 to 25 parts by weight, based on 100 parts by weight of the solvent used to dissolve the hydroxyl-containing polymer and the thiol-containing silane coupling agent.

In an embodiment, the weight ratio of the hydroxyl-containing polymer to the thiol-containing silane coupling agent is from 1:5 to 10:1, preferably from 1:3 to 3:1, more preferably from 1:2 to 2:1, and most preferably from 1:1.5 to 1.5:1.

In an embodiment, the crosslinking agent is at least one aldehyde, such as formaldehyde, acetaldehyde, propanal, butyraldehyde, pentanal, oxalic aldehyde, propandial, butandial, pentandial, and mixture thereof, preferably formaldehyde, acetaldehyde, propanal, butyraldehyde, and mixture thereof, and more preferably formaldehyde.

In an embodiment, the hydroxyl-containing polymer, the thiol-containing silane coupling agent and the crosslinking agent thermally react with each other, preferably in the presence of a crosslinking catalyst, to form the crosslinked network structure. The crosslinking catalyst may be at least one acid, such as sulfuric acid, hydrochloride acid, acetic acid, phosphoric acid, formic acid, nitric acid, and mixture thereof, preferably sulfuric acid, hydrochloride acid, acetic acid, and mixture thereof, and more preferably sulfuric acid. The crosslinking catalyst may also be at least sulfate, for example, sodium sulfate, potassium sulfate, magnesium sulfate, ammonium sulfate, and mixture thereof. The acid crosslinking catalyst and the sulfate crosslinking catalyst may be used alone or in combination.

In an embodiment, the oxidant is chosen from peroxide hydrogen, potassium permanganate, potassium perchlorate, potassium bichromate, nitric acid, and mixture thereof, and preferably peroxide hydrogen.

In a second aspect, the present invention further provides a process for preparing the complex nanofiltration membrane of the invention, comprising the steps of (1) dissolving a hydroxyl-containing polymer and a thiol-containing silane coupling agent in a solvent to prepare a coating solution;

(2) applying the coating solution on a substrate to form an initial membrane;

(3) immersing the initial membrane from step (2) in a crosslinking solution comprising a crosslinking agent and a crosslinking catalyst in a solvent to conduct a crosslinking reaction, to obtain an initial complex nanofiltration membrane comprising the substrate and a separating layer, which is a crosslinked network structure positioned on the surface of the substrate; and (4) treating the initial complex nanofiltration membrane with an aqueous solution containing an oxidant, to afford a final complex nanofiltration membrane.

The hydroxyl-containing polymer and the thiol-containing silane coupling agent are as described hereinabove.

In an embodiment, in step (1), the hydroxyl-containing polymer is used in an amount of from 0.1 to 50 parts by weight, and preferably from 0.25 to 25 parts by weight, and the thiol-containing silane coupling agent is used in an amount of from 0.01 to 50 parts by weight, and preferably from 0.025 to 25 parts by weight, based on 100 parts by weight of the solvent used to dissolve the hydroxyl-containing polymer and the thiol-containing silane coupling agent.

In the present invention, there are no specific limitations to the solvent used in step (1), as long as it is capable of dissolving the hydroxyl-containing polymer and the thiol-containing silane coupling agent and substantially inert in subsequent reactions. For example, the solvent may be chosen from water, methanol, ethanol, acetone, ethylene glycol monomethyl ether, ethylene glycol, dimethyl sulfoxide, and mixture thereof, with a mixed solvent of water, ethanol and dimethyl sulfoxide being preferred. In an embodiment, in such a mixed solvent, the weight ratio of water to ethanol to dimethyl sulfoxide may be in a range of (1 to 50):(1 to 30):1, and preferably in a range of (1 to 25):(1 to 20):1.

According to the present invention, the preparation of the coating solution is preferably carried out in the presence of a sol-gel catalyst, such as sulfuric acid, hydrochloride acid, acetic acid, phosphoric acid, formic acid, nitric acid, and mixture thereof, preferably hydrochloride acid. The sol-gel catalyst is generally used in an amount of from 0.01 to 50 parts by weight, and preferably from 0.025 to 25 parts by weight, relative to 100 parts by weight of the solvent. In an embodiment, the coating solution has a pH value ranging from 1 to 4.

The dissolution of the hydroxyl-containing polymer and the thiol-containing silane coupling agent in the solvent can be accomplished by conventional operations, for example, by stirring at room temperature.

In a preferred embodiment, prior to applying the coating solution on the substrate, the coating solution has been subjected to filtration, thereby obtaining a clear coating solution.

In the present invention, there are no specific limitations to the thickness of the substrate. However, it is preferred that the substrate has a thickness in a range of from 50 to 300 microns, preferably from 90 to 150 microns, and more preferably from 100 to 120 microns.

In an embodiment, the coating solution is used in such an amount that the resultant separating layer has a thickness in a range of from 0.03 to 1.0 microns, preferably from 0.05 to 0.5 microns, and more preferably from 0.1 to 0.3 microns.

The application of the coating solution on the substrate may be accomplished by any one of coating methods known in the art, such as spray coating, knife coating, spin coating, dip coating, roller coating, and the like.

In a preferred embodiment, the process of the present invention further comprises fixing the substrate on a baseplate or a coating machine, prior to the application of the coating solution on the substrate.

In an embodiment, after applying uniformly the coating solution on the substrate, the coated substrate is placed in an oven to evaporate substantially all of the solvent. The temperature inside the oven and the oven-drying time may be suitably selected to ensure the evaporation of the solvent. For example, the coated substrate may be dried in an oven at 50 to 70° C. for 20 to 40 minutes or, alternatively, in an oven at 55 to 65° C. for 25 to 35 minutes.

In an embodiment, the crosslinking agent used in the invention is at least one aldehyde, such as formaldehyde, acetaldehyde, propanal, butyraldehyde, pentanal, oxalic aldehyde, propandial, butandial, pentandial, and mixture thereof, preferably formaldehyde, acetaldehyde, propanal, butyraldehyde, and mixture thereof, and more preferably formaldehyde.

The crosslinking catalyst useful in the invention is at least one acid, such as sulfuric acid, hydrochloride acid, acetic acid, phosphoric acid, formic acid, nitric acid, and mixture thereof, preferably sulfuric acid, hydrochloride acid, acetic acid, and mixture thereof, and more preferably sulfuric acid. Another crosslinking catalyst useful in the invention is at least one sulfate, for example, sodium sulfate, potassium sulfate, magnesium sulfate, ammonium sulfate, and mixture thereof, preferably sodium sulfate, potassium sulfate, magnesium sulfate, and mixture thereof, and more preferably sodium sulfate. The acid crosslinking catalyst and the sulfate crosslinking catalyst may be used alone or in combination.

The solvent used in the crosslinking solution may be any one that provides suitable solubilities to the crosslinking agent and the crosslinking catalyst and is substantially inert. Conveniently, the solvent is water.

In the present invention, there are no specific limitations to the amounts of the crosslinking agent and the crosslinking catalyst in the crosslinking solution, as long as the resultant complex nanofiltration membrane can have excellent acid/alkali-tolerance, a suitable strength, a high water flux, and a high salt rejection. However, the crosslinking agent is preferably used in an amount of from 1 to 100 wt. %, preferably from 3 to 50 wt. %, and more preferably from 10 to 50 wt. %, the acid as a crosslinking catalyst is preferably used in an amount of from 1 to 98 wt. %, and preferably from 5 to 80 wt. %, and the sulfate as a crosslinking catalyst is preferably used in an amount of from 1 to 60 wt. %, and preferably from 5 to 50 wt. %, based on the total weight of the solvent in the crosslinking solution.

In an embodiment, the crosslinking reaction in step (3) is conducted under conditions including a crosslinking temperature of from 20 to 100° C. and a crosslinking time of from 10 minutes to 48 hours, and preferably a crosslinking temperature of from 40 to 80° C. and a crosslinking time of from 20 minutes to 24 hours.

The oxidant useful in the present invention may be chosen from peroxide hydrogen, potassium permanganate, potassium perchlorate, potassium bichromate, nitric acid, and mixture thereof, and preferably peroxide hydrogen.

According to the present invention, in step (4), the initial complex nanofiltration membrane is treated with an aqueous solution containing the oxidant, to afford a final complex nanofiltration membrane. The conditions for the treatment include a treatment temperature of from 25 to 100° C. and a treatment time of from 1 minute to 10 hours. Preferably, the treatment temperature is in a range of from 40 to 80° C., and the treatment time is in a range of from 10 minutes to 5 hours. It is believed that this treatment can result in that the resultant complex nanofiltration membrane has excellent acid/alkali-tolerance, a high water flux and a high salt rejection.

In an embodiment, the oxidant-containing aqueous solution has an oxidant concentration of from 0.1 to 20 wt. %, preferably from 1 to 10 wt. %, and more preferably from 1.5 to 6 wt. %.

In a third aspect, the present invention further provides complex nanofiltration membranes prepared by the process of the present invention.

In a forth aspect, the present invention further provides use of the complex nanofiltration membranes of the present invention in water treatment.

In an embodiment, the present invention relates to a process for treating an aqueous stream, comprising contacting the aqueous stream with the complex nanofiltration membrane of the present invention and allowing water to permeate through the membrane, thereby producing a treated aqueous stream and a permeated aqueous stream.

In an embodiment, the aqueous stream to be treated may be fresh water, seawater, potable water, oil-contaminated water, waste water, or an aqueous stream produced in the production of chemicals such as dyes, antibiotics, polypeptides and polysaccharides.

EXAMPLES

The following examples are given for further illustrating the invention, but do not make limitations to the invention in any way.

In the following Examples and Comparative Examples:

(1) The water flux of a complex nanofiltration membrane is measured as follows: the complex nanofiltration membrane to be measured is fixed in a membrane cell, and pre-pressurized at 1.2 MPa for 0.5 hours. Then, the amount of water permeating through the nanofiltration membrane at 25° C. under 2.0 MPa over 1 hour is measured, and the water flux is calculated according the following equation:

$$J=Q/(A \cdot t),$$

wherein J represents water flux, Q represents the amount of permeated water (L), A represents the effective membrane area of the complex nanofiltration membrane (m²), and t represents permeation time (h).

(2) The salt rejection of a complex nanofiltration membrane is measured as follows: the complex nanofiltration membrane to be measured is fixed in a membrane cell, and pre-pressurized at 1.2 MPa for 0.5 hours. Then, an aqueous solution of sodium sulfate with an initial concentration of 2000 ppm at 25° C. under 2.0 MPa is applied to one side of the membrane and allowed to permeate through the membrane. After 1 hour, the difference between the initial sodium sulfate concentration (2000 ppm) of the original aqueous solution and the sodium sulfate concentration of the permeated liquor is determined, and the salt rejection is calculated according the following equation:

$$R=(C_p-C_f)/C_p \times 100\%,$$

wherein R represents salt rejection, $C_p$ represents the concentration of sodium sulfate in the original solution, and $C_f$ represents the concentration of sodium sulfate in the permeated liquor.

(3) The evaluation of the acid-tolerance of a complex nanofiltration membrane: the acid-tolerance of a complex nanofiltration membrane is evaluated by the change of water flux and salt rejection of the membrane before and after the membrane has been soaked in a 5 wt. % $H_2SO_4$ aqueous solution for 30 days. The smaller the change, the better the acid-tolerance.

(4) The evaluation of the alkali-tolerance of a complex nanofiltration membrane: the alkali-tolerance of a complex nanofiltration membrane is evaluated by the change of water flux and salt rejection of the membrane before and after the membrane has been soaked in a 4 wt. % NaOH aqueous solution for 30 days. The smaller the change, the better the alkali-tolerance.

In addition, the following materials were used in Examples and Comparative Examples:

Polyvinyl alcohol (PVA) (having an alcoholysis degree of 95% and a weight average molecular weight of 95000): purchased from J&K Scientific Ltd.;

γ-Mercaptopropyl trimethoxy silane (KH590) and γ-mercaptopropyl triethoxy silane (KH580): purchased from J&K Scientific Ltd.;

Polysulfone substrate membrane (having a thickness of 120 microns): purchased from Meiyi Membrane Scientific Ltd., Hangzhou;

Peroxide hydrogen and other chemical reagents: purchased from Sinopharm Chemical Reagent Beijing Co., Ltd.

Example 1

1.0 g of polyvinyl alcohol (PVA) and 1.0 g of γ-mercaptopropyl triethoxy silane (KH580) were mixed with 100 g of deionized water. Then 1 mol/L dilute hydrochloride acid was added dropwise with stirring thereto, to adjust the pH value of the mixture to 1. After stirred at room temperature for 24 h, the reaction mixture was filtrated to afford a clear coating solution.

The coating solution was coated uniformly on a polysulfone substrate membrane. Then the coated membrane was placed in an oven at 60° C. for 30 min to remove the solvent. Next, the dried membrane was soaked in a solution containing 100 g of water, 10 g of concentrated sulfuric acid, 10 g of formaldehyde and 15 g of sodium sulfate at 50° C. for 30 min. Then the resulting initial complex nanofiltration membrane was removed, washed with water, and soaked in deionized water for use.

The initial complex nanofiltration membrane was treated with 2 wt. % peroxide hydrogen aqueous solution at 50° C. for 1 hour, to afford a final complex nanofiltration membrane. The final complex nanofiltration membrane was removed, washed with deionized water, and soaked in deionized water.

After a sample of the complex nanofiltration membrane had been soaked in deionized water for 24 hours, water flux and salt rejection were measured. The results are shown in Table 1 below.

The acid-tolerance and the alkali-tolerance of the complex nanofiltration membrane were also evaluated, and the results are shown in Table 1.

Figure 1:
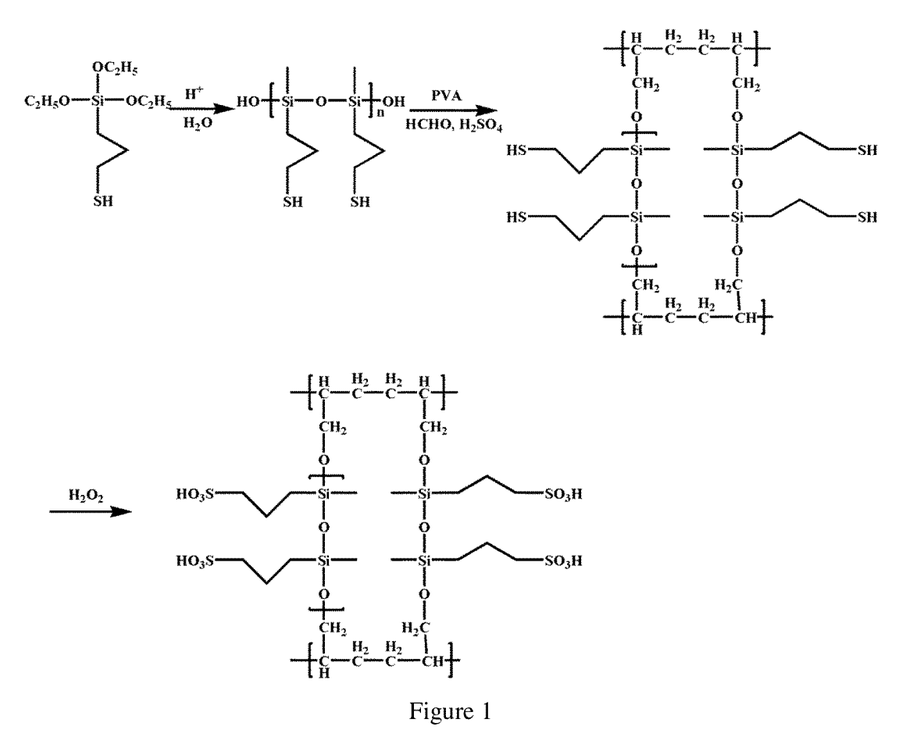
FIG. 1 illustrates schematically the formation of the complex nanofiltration membrane according to one embodiment of the invention.
Figure 2:
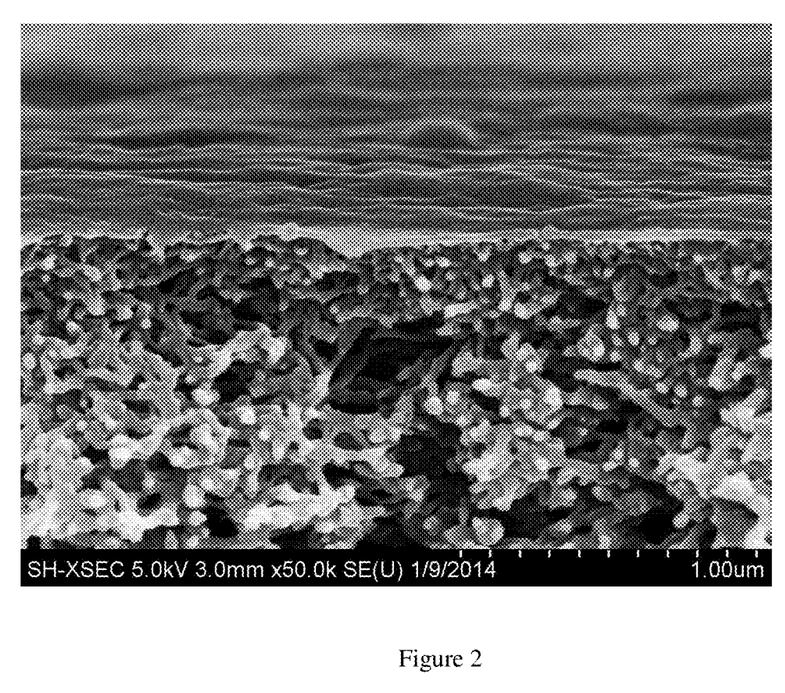
FIG. 2 is a SEM micrograph of the cross-section of a sample of the complex nanofiltration membrane prepared in Example 1.

FIG. 1 illustrates schematically the formation of the complex nanofiltration membrane according to one embodiment of the invention. A thiol-containing silane coupling agent is first hydrolyzed, then the hydrolyzed product react with PVA and formaldehyde under acidic condition to form a crosslinked network structure positioned on the substrate (not shown), i.e., an initial complex nanofiltration membrane. Finally, the initial complex nanofiltration membrane is soaked in a peroxide hydrogen solution to conduct a modification treatment, to afford a final complex nanofiltration membrane.

Example 2

1.0 g of PVA and 0.75 g of γ-mercaptopropyl trimethoxy silane were mixed with 100 g of deionized water. Then 1 mol/L dilute hydrochloride acid was added dropwise with stirring thereto, to adjust the pH value of the mixture to 4. After stirred at room temperature for 24 h, the reaction mixture was filtrated to afford a clear coating solution.

The coating solution was coated uniformly on a polysulfone substrate membrane. Then the coated membrane was placed in an oven at 60° C. for 30 min to remove the solvent. Next, the dried membrane was soaked in a solution containing 100 g of water, 15 g of concentrated sulfuric acid, 15 g of formaldehyde and 20 g of sodium sulfate at 50° C. for 30 min. Then the resulting initial complex nanofiltration membrane was removed, washed with water, and soaked in deionized water for use.

The initial complex nanofiltration membrane was treated with 2 wt. % peroxide hydrogen aqueous solution at 50° C. for 1 hour, to afford a final complex nanofiltration membrane. The final complex nanofiltration membrane was removed, washed with deionized water, and soaked in deionized water.

After a sample of the complex nanofiltration membrane had been soaked in deionized water for 24 hours, water flux and salt rejection were measured. The results are shown in Table 1 below.

The acid-tolerance and the alkali-tolerance of the complex nanofiltration membrane were also evaluated, and the results are shown in Table 1.

Example 3

1.0 g of chitosan ($M_w$=100000) and 1.25 g of γ-mercaptopropyl triethoxy silane (KH580) were mixed with 100 g of deionized water. Then 1 mol/L dilute hydrochloride acid was added dropwise with stirring thereto, to adjust the pH value of the mixture to 3. After stirred at room temperature for 24 h, the reaction mixture was filtrated to afford a clear coating solution.

The coating solution was coated uniformly on a polysulfone substrate membrane. Then the coated membrane was placed in an oven at 60° C. for 30 min to remove the solvent. Next, the dried membrane was soaked in a solution containing 100 g of water, 20 g of concentrated sulfuric acid, 20 g of formaldehyde and 25 g of sodium sulfate at 70° C. for 30 min. Then the resulting initial complex nanofiltration membrane was removed, washed with water, and soaked in deionized water for use.

The initial complex nanofiltration membrane was treated with 2 wt. % peroxide hydrogen aqueous solution at 50° C. for 1 hour, to afford a final complex nanofiltration membrane. The final complex nanofiltration membrane was removed, washed with deionized water, and soaked in deionized water.

After a sample of the complex nanofiltration membrane had been soaked in deionized water for 24 hours, water flux and salt rejection were measured. The results are shown in Table 1 below.

The acid-tolerance and the alkali-tolerance of the complex nanofiltration membrane were also evaluated, and the results are shown in Table 1.

Example 4

A complex nanofiltration membrane was prepared by following the procedure described in Example 1, except that the amount of the γ-mercaptopropyl triethoxy silane (KH580) was changed from 1.0 g to 0.5 g.

After a sample of the complex nanofiltration membrane had been soaked in deionized water for 24 hours, water flux and salt rejection were measured. The results are shown in Table 1 below.

The acid-tolerance and the alkali-tolerance of the complex nanofiltration membrane were also evaluated, and the results are shown in Table 1.

Example 5

A complex nanofiltration membrane was prepared by following the procedure described in Example 1, except that the amount of the γ-mercaptopropyl triethoxy silane (KH580) was changed from 1.0 g to 0.75 g.

After a sample of the complex nanofiltration membrane had been soaked in deionized water for 24 hours, water flux and salt rejection were measured. The results are shown in Table 1 below.

The acid-tolerance and the alkali-tolerance of the complex nanofiltration membrane were also evaluated, and the results are shown in Table 1.

Comparative Example 1

A complex nanofiltration membrane was prepared by following the procedure described in Example 1, except that the membrane was not treated with the peroxide hydrogen solution.

After a sample of the complex nanofiltration membrane had been soaked in deionized water for 24 hours, water flux and salt rejection were measured. The results are shown in Table 1 below.

The acid-tolerance and the alkali-tolerance of the complex nanofiltration membrane were also evaluated, and the results are shown in Table 1.

TABLE 1

| No. | Prior to the acid/base treatment | | After $H_2SO_4$ treatment* | | After NaOH treatment** | |
|---|---|---|---|---|---|---|
| | Water Flux ($L/(m^2h)$) | Salt Rejection (%) | Water Flux ($L/(m^2h)$) | Salt Rejection | Water Flux ($L/(m^2h)$) | Salt Rejection |
| Example 1 | 10.9 | 97.42 | 11.0 | 97.45 | 11.6 | 96.82 |
| Example 2 | 15.2 | 95.76 | 15.1 | 95.72 | 15.9 | 94.85 |
| Example 3 | 13.0 | 96.18 | 13.5 | 96.15 | 14.5 | 95.62 |
| Example 4 | 11.6 | 97.22 | 11.8 | 97.25 | 12.8 | 96.81 |
| Example 5 | 11.2 | 97.30 | 11.5 | 97.28 | 12.8 | 96.21 |
| Comparative Example 1 | 10.6 | 95.52 | 10.8 | 95.56 | 11.8 | 94.96 |

*The sample of the membrane to be tested had been soaked in a 5 wt. % $H_2SO_4$ aqueous solution for 30 days.
**The sample of the membrane to be tested had been soaked in a 4 wt. % NaOH aqueous solution for 30 days.

Example 6

A complex nanofiltration membrane was prepared by following the procedure described in Example 1, except that the initial complex nanofiltration membrane was treated with 3 wt. % peroxide hydrogen solution.

After a sample of the complex nanofiltration membrane had been soaked in deionized water for 24 hours, water flux and salt rejection were measured. The results are shown in Table 2 below.

The acid-tolerance and the alkali-tolerance of the complex nanofiltration membrane were also evaluated, and the results are shown in Table 2.

Example 7

A complex nanofiltration membrane was prepared by following the procedure described in Example 1, except that the initial complex nanofiltration membrane was treated with 4 wt. % peroxide hydrogen solution.

After a sample of the complex nanofiltration membrane had been soaked in deionized water for 24 hours, water flux and salt rejection were measured. The results are shown in Table 2 below.

The acid-tolerance and the alkali-tolerance of the complex nanofiltration membrane were also evaluated, and the results are shown in Table 2.

Example 8

A complex nanofiltration membrane was prepared by following the procedure described in Example 1, except that the initial complex nanofiltration membrane was treated with 5 wt. % peroxide hydrogen solution.

After a sample of the complex nanofiltration membrane had been soaked in deionized water for 24 hours, water flux and salt rejection were measured. The results are shown in Table 2 below.

The acid-tolerance and the alkali-tolerance of the complex nanofiltration membrane were also evaluated, and the results are shown in Table 2.

Example 9

A complex nanofiltration membrane was prepared by following the procedure described in Example 1, except that the initial complex nanofiltration membrane was treated with 6 wt. % peroxide hydrogen solution.

After a sample of the complex nanofiltration membrane had been soaked in deionized water for 24 hours, water flux and salt rejection were measured. The results are shown in Table 2 below.

The acid-tolerance and the alkali-tolerance of the complex nanofiltration membrane were also evaluated, and the results are shown in Table 2.

Example 10

A complex nanofiltration membrane was prepared by following the procedure described in Example 1, except that the initial complex nanofiltration membrane was treated with 8 wt. % peroxide hydrogen solution.

After a sample of the complex nanofiltration membrane had been soaked in deionized water for 24 hours, water flux and salt rejection were measured. The results are shown in Table 2 below.

The acid-tolerance and the alkali-tolerance of the complex nanofiltration membrane were also evaluated, and the results are shown in Table 2.

Example 11

A complex nanofiltration membrane was prepared by following the procedure described in Example 1, except that the initial complex nanofiltration membrane was treated with 10 wt. % peroxide hydrogen solution.

After a sample of the complex nanofiltration membrane had been soaked in deionized water for 24 hours, water flux and salt rejection were measured. The results are shown in Table 2 below.

The acid-tolerance and the alkali-tolerance of the complex nanofiltration membrane were also evaluated, and the results are shown in Table 2.

Example 12

A complex nanofiltration membrane was prepared by following the procedure described in Example 1, except that the initial complex nanofiltration membrane was treated with 6 wt. % peroxide hydrogen solution at 60° C. for 1 hour.

After a sample of the complex nanofiltration membrane had been soaked in deionized water for 24 hours, water flux and salt rejection were measured. The results are shown in Table 3 below.

The acid-tolerance and the alkali-tolerance of the complex nanofiltration membrane were also evaluated, and the results are shown in Table 3.

Example 13

A complex nanofiltration membrane was prepared by following the procedure described in Example 1, except that the initial complex nanofiltration membrane was treated with 6 wt. % peroxide hydrogen solution at 70° C. for 1 hour.

After a sample of the complex nanofiltration membrane had been soaked in deionized water for 24 hours, water flux and salt rejection were measured. The results are shown in Table 3 below.

The acid-tolerance and the alkali-tolerance of the complex nanofiltration membrane were also evaluated, and the results are shown in Table 3.

Example 14

A complex nanofiltration membrane was prepared by following the procedure described in Example 1, except that the initial complex nanofiltration membrane was treated with 6 wt. % peroxide hydrogen solution at 60° C. for 0.5 hours.

After a sample of the complex nanofiltration membrane had been soaked in deionized water for 24 hours, water flux and salt rejection were measured. The results are shown in Table 3 below.

The acid-tolerance and the alkali-tolerance of the complex nanofiltration membrane were also evaluated, and the results are shown in Table 3.

Example 15

A complex nanofiltration membrane was prepared by following the procedure described in Example 1, except that the initial complex nanofiltration membrane was treated with 6 wt. % peroxide hydrogen solution at 60° C. for 1.5 hours.

TABLE 2

| | Prior to the acid/base treatment | | After $H_2SO_4$ treatment* | | After NaOH treatment** | |
| --- | --- | --- | --- | --- | --- | --- |
| No. | Water Flux (L/($m^2$h)) | Salt Rejection (%) | Water Flux (L/($m^2$h)) | Salt Rejection (%) | Water Flux (L/($m^2$h)) | Salt Rejection (%) |
| Example 6 | 22.1 | 97.10 | 22.0 | 96.82 | 28.5 | 95.11 |
| Example 7 | 30.8 | 97.31 | 30.9 | 97.20 | 34.2 | 95.20 |
| Example 8 | 35.9 | 97.36 | 37.1 | 97.15 | 40.1 | 95.45 |
| Example 9 | 43.3 | 97.96 | 44.2 | 97.63 | 49.6 | 95.82 |
| Example 10 | 58.9 | 96.25 | 60.3 | 95.88 | 65.9 | 94.22 |
| Example 11 | 88.6 | 90.52 | 90.6 | 88.95 | 94.6 | 86.42 |

*The sample of the membrane to be tested had been soaked in a 5 wt. % $H_2SO_4$ aqueous solution for 30 days.
**The sample of the membrane to be tested had been soaked in a 4 wt. % NaOH aqueous solution for 30 days.

After a sample of the complex nanofiltration membrane had been soaked in deionized water for 24 hours, water flux and salt rejection were measured. The results are shown in Table 3 below.

The acid-tolerance and the alkali-tolerance of the complex nanofiltration membrane were also evaluated, and the results are shown in Table 3.

Example 16

A complex nanofiltration membrane was prepared by following the procedure described in Example 1, except that the initial complex nanofiltration membrane was treated with 6 wt. % peroxide hydrogen solution at 60° C. for 2 hours.

After a sample of the complex nanofiltration membrane had been soaked in deionized water for 24 hours, water flux and salt rejection were measured. The results are shown in Table 3 below.

The acid-tolerance and the alkali-tolerance of the complex nanofiltration membrane were also evaluated, and the results are shown in Table 3.

Example 17

A complex nanofiltration membrane was prepared by following the procedure described in Example 1, except that the initial complex nanofiltration membrane was treated with 6 wt. % peroxide hydrogen solution at 70° C. for 1.5 hours.

After a sample of the complex nanofiltration membrane had been soaked in deionized water for 24 hours, water flux and salt rejection were measured. The results are shown in Table 3 below.

The acid-tolerance and the alkali-tolerance of the complex nanofiltration membrane were also evaluated, and the results are shown in Table 3.

TABLE 3

| No. | Prior to the acid/base treatment | | After $H_2SO_4$ treatment* | | After NaOH treatment** | |
|---|---|---|---|---|---|---|
| | Water Flux (L/($m^2$h)) | Salt Rejection (%) | Water Flux (L/($m^2$h)) | Salt Rejection (%) | Water Flux (L/($m^2$h)) | Salt Rejection (%) |
| Example 12 | 48.5 | 97.30 | 49.2 | 96.88 | 52.3 | 95.10 |
| Example 13 | 60.3 | 94.52 | 60.9 | 94.15 | 71.9 | 90.68 |
| Example 14 | 29.8 | 96.89 | 31.5 | 96.12 | 32.8 | 94.85 |
| Example 15 | 44.9 | 97.00 | 44.8 | 96.52 | 48.8 | 93.87 |
| Example 16 | 58.2 | 96.85 | 59.6 | 96.41 | 61.5 | 93.98 |
| Example 17 | 62.8 | 94.20 | 64.8 | 93.95 | 70.5 | 90.68 |

*The sample of the membrane to be tested had been soaked in a 5 wt. % $H_2SO_4$ aqueous solution for 30 days.
**The sample of the membrane to be tested had been soaked in a 4 wt. % NaOH aqueous solution for 30 days.

It can be seen from the results of Example 1-17 that the complex nanofiltration membranes of the invention have excellent water fluxes and salt rejections, good acid-tolerance, and good alkali-tolerance. In addition, it can be seen from the comparison between Example 1-17 and Comparative Example 1 that the complex nanofiltration membrane that has not subjected to peroxide hydrogen solution treatment has a low water flux and a low salt rejection.

While the illustrative embodiments of the invention have been described with particularity, it will be understood that various other modifications will be apparent to and may be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. The present invention has been described above with reference to many embodiments and specific examples. Considering the above detailed description, many variations will be apparent for those skilled in the art. All of such variations will be within the scope of the whole purpose of the appended claims In this disclosure, whenever a composition, an element or a group of elements is preceded with the transitional phrase "comprising", it is understood that we also contemplate the same composition, element or group of elements with transitional phrases "consisting essentially of", "consisting of", "selected from the group consisting of", or "is" preceding the recitation of the composition, element, or elements, and vice versa.

In addition, it should be understood that a specific technical feature described for an aspect and/or embodiment of the invention may be combined with another aspect and/or embodiment of the invention, unless there is a conflict in such a combination.

What is claimed is:

1. A complex nanofiltration membrane, comprising a substrate and a separating layer deposited directly on the substrate,
    wherein the separating layer consists of an oxidant-treated, crosslinked network structure formed from a hydroxyl-containing polymer, a thiol-containing silane coupling agent and a crosslinking agent, the hydroxyl-containing polymer being selected from the group consisting of polyethylene glycols, polyvinyl alcohols, chitosans, chitosan quaternary ammonium salts, polyether polyols, polyester polyols, and mixtures thereof, and the crosslinking agent being selected from the group consisting of formaldehyde, acetaldehyde, propanal, butyraldehyde, pentanal, oxalic aldehyde, propandial, butandial, pentandial, and mixture thereof, and
    wherein the substrate consists of a layer made of a material selected from the group consisting of polyacrylonitrile, polyvinylidene fluoride, phenolphthalein non-sulfonated poly(aromatic ether sulphone), polyether sulphone, bisphenol A-type polysulfone, and a mixture thereof.

2. The complex nanofiltration membrane of claim 1, wherein at least one of:
    that the substrate has a thickness of from 50 to 300 microns;

that the separating layer has a thickness of from 0.03 to 1.0 microns;

that the thiol-containing silane coupling agent is at least one of γ-mercaptopropyl trimethoxy silane, γ-mercaptopropyl triethoxy silane, (2-mercaptoethyl) triethoxy silane and (2-mercaptoethyl) trimethoxy silane;

that the weight ratio of the hydroxyl-containing polymer to the thiol-containing silane coupling agent is from 1:5 to 10:1;

and that the oxidant is chosen from peroxide hydrogen, potassium permanganate, potassium perchlorate, potassium bichromate, nitric acid, and mixtures thereof.

3. The complex nanofiltration membrane of claim 1, wherein the substrate has a thickness of from 90 to 150 microns.

4. The complex nanofiltration membrane of claim 1, wherein the separating layer has a thickness of from 0.05-0.5 micron.

5. A process for preparing the complex nanofiltration membrane of claim 1, comprising the steps of
   (1) dissolving a hydroxyl-containing polymer and a thiol-containing silane coupling agent in a solvent to prepare a coating solution;
   (2) applying the coating solution on a substrate to form an initial membrane;
   (3) immersing the initial membrane from step (2) in a crosslinking solution comprising a crosslinking agent and a crosslinking catalyst in a solvent to conduct a crosslinking reaction, to obtain an initial complex nanofiltration membrane comprising the substrate and a separating layer, which is a crosslinked network structure positioned on the surface of the substrate; and
   (4) treating the initial complex nanofiltration membrane with an aqueous solution containing an oxidant, to afford a final complex nanofiltration membrane.

6. The process of claim 5, wherein at least one of:

that in step (1), the hydroxyl-containing polymer is used in an amount of from 0.1 to 50 parts by weight, based on 100 parts by weight of the solvent, and the thiol-containing silane coupling agent is used in an amount of from 0.01 to 50 parts by weight, based on 100 parts by weight of the solvent;

that the solvent used in step (1) is chosen from water, methanol, ethanol, acetone, ethylene glycol monomethyl ether, ethylene glycol, dimethyl sulfoxide, and mixture thereof;

that the substrate has a thickness of from 50 to 300 microns;

that in step (2), the coating solution is used in such an amount that the separating layer of the final complex nanofiltration membrane has a thickness of from 0.03 to 1.0 microns;

that in step (3), the crosslinking reaction is conducted under conditions including a crosslinking temperature in a range of from 20 to 100° C. and a crosslinking time in a range of from 10 minutes to 48 hours;

that the crosslinking catalyst is chosen from acids, sulfates, and mixture thereof;

that the treatment in step (4) is conducted under conditions including a treating temperature in a range of from 25 to 100° C. and a treating time in a range of from 1 minute to 10 hours;

that the aqueous solution containing an oxidant has a concentration of from 0.1 to 20 wt. %;

that the oxidant is chosen from peroxide hydrogen, potassium permanganate, potassium perchlorate, potassium bichromate, nitric acid, and mixture thereof.

7. The process of claim 5, wherein in step (1), the hydroxyl-containing polymer is used in an amount of from 0.25 to 25 parts by weight, based on 100 parts by weight of the solvent, and the thiol-containing silane coupling agent is used in an amount of from 0.025 to 25 parts by weight, based on 100 parts by weight of the solvent.

8. The process of claim 5, wherein the substrate has a thickness of from 90 to 150 microns.

9. The process of claim 5, wherein the coating solution is used in such an amount that the separating layer of the final complex nanofiltration membrane has a thickness of from 0.05 to 0.5 microns.

10. The process of claim 5, wherein the solvent used in step (1) is a mixed solvent of water, ethanol and dimethyl sulfoxide.

11. The process of claim 10, wherein in the mixed solvent, the weight ratio of water to ethanol to dimethyl sulfoxide is (1 to 50):(1 to 30):1.

12. The process of claim 5, wherein in step (3), the crosslinking reaction is conducted under conditions including a crosslinking temperature in a range of from 40 to 80° C. and a crosslinking time in a range of from 20 minutes to 24 hours.

13. The process of claim 5, wherein the crosslinking agent is used in an amount of from 1 to 100 wt. %, based on the total weight of the solvent in the crosslinking solution.

14. The process of claim 5, wherein the crosslinking catalyst is selected from the group consisting of acids, sulfates, and mixture thereof, wherein when an acid is used, it is used in an amount of from 1 to 98 wt. %, based on the total weight of the solvent in the crosslinking solution, and wherein when a sulfate is used, it is used in an amount of from 1 to 60 wt. %, based on the total weight of the solvent in the crosslinking solution.

15. The process of claim 14, wherein the acids are selected from the group consisting of sulfuric acid, hydrochloride acid, acetic acid, phosphoric acid, formic acid, nitric acid, and mixture thereof; and wherein the sulfates are selected from the group consisting of sodium sulfate, potassium sulfate, magnesium sulfate, ammonium sulfate, and mixture thereof.

16. The process of claim 6, wherein the acids are selected from the group consisting of sulfuric acid, hydrochloride acid, acetic acid, phosphoric acid, formic acid, nitric acid, and mixture thereof, and wherein the sulfates are selected from the group consisting of sodium sulfate, potassium sulfate, magnesium sulfate, ammonium sulfate, and mixture thereof.

17. The process of claim 5, wherein the aqueous solution containing an oxidant has a concentration of 1 to 10 wt. %.

18. A complex nanofiltration membrane prepared by the process of claim 5.

19. A method for treating an aqueous stream, comprising contacting the aqueous stream with the complex nanofiltration membrane of claim 1 and allowing water to permeate through the membrane, thereby producing a treated aqueous stream and a permeated aqueous stream.

20. A method for treating an aqueous stream, comprising contacting the aqueous stream with the complex nanofiltration membrane of claim 18 and allowing water to permeate through the membrane, thereby producing a treated aqueous stream and a permeated aqueous stream.

21. The complex nanofiltration membrane of claim 1, wherein the separating layer has a thickness of from 0.1 to 0.3 microns.

* * * * *